(12) United States Patent
Huber et al.

(10) Patent No.: US 8,122,203 B2
(45) Date of Patent: Feb. 21, 2012

(54) SERVICEABILITY LEVEL INDICATOR PROCESSING FOR STORAGE ALTERATION

(75) Inventors: Harold Steven Huber, Tucson, AZ (US); Miguel Angel Perez, Tucson, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 12/100,544

(22) Filed: Apr. 10, 2008

(65) Prior Publication Data

US 2009/0259794 A1    Oct. 15, 2009

(51) Int. Cl.
*G06F 12/00* (2006.01)
*G06F 13/00* (2006.01)
*G06F 13/28* (2006.01)
*G06F 7/04* (2006.01)
*G06F 12/14* (2006.01)
*G06F 17/30* (2006.01)
*G06F 11/00* (2006.01)
*G06F 12/16* (2006.01)
*G06C 7/00* (2006.01)
*G08B 23/00* (2006.01)

(52) U.S. Cl. .......... 711/154; 711/152; 711/163; 726/17; 726/26

(58) Field of Classification Search .................. None
See application file for complete search history.

(56) References Cited

U.S. PATENT DOCUMENTS

| 5,083,293 | A | 1/1992 | Gilberg et al. |
| 5,428,761 | A | 6/1995 | Herlihy et al. |
| 5,875,484 | A * | 2/1999 | Neuhard et al. ............... 711/167 |
| 6,042,006 | A | 3/2000 | Van Tilburg et al. |
| 6,401,178 | B1 | 6/2002 | Gagne et al. |
| 6,938,055 | B2 | 8/2005 | Iida et al. |
| 7,249,231 | B2 | 7/2007 | Babudri et al. |
| 2008/0098189 | A1 * | 4/2008 | Addison et al. ............... 711/163 |

OTHER PUBLICATIONS

IBM TDB NN9308133—Dynamic Setup of SLIP PER Traps; Aug. 1, 1993.*
IBM—Initialization Statement Errors—z/OS V1R9.0 JES2 Diagnosis; GA22-7531-07—1990, 2007.*
IBM—SLIP command—Chapter 4. MVS System Commands Reference, z/OS V1R9.0 MVS System Commands, p. 4-515-4-584—1990, 2007.*

* cited by examiner

*Primary Examiner* — Sanjiv Shah
*Assistant Examiner* — Marwan Ayash
(74) *Attorney, Agent, or Firm* — Griffiths & Seaton PLLC

(57) ABSTRACT

A method, system, and computer program product for implementing Serviceability Level Indicator Processing (SLIPs) for storage alterations in a computer system is provided. A plurality of storage release requests is analyzed to identify an address monitored by a storage alteration slip. Upon identification of the address, the storage alteration slip is disabled and an initialization slip is re-enabled.

18 Claims, 2 Drawing Sheets

SERVICEABILITY LEVEL INDICATOR PROCESSING FOR STORAGE ALTERATION

BACKGROUND OF THE INVENTION

1. Field of the Invention

The present invention relates in general to computers, and more particularly to apparatus, method and computer program product embodiments for implementing Serviceability Level Indicator Processing (SLIPs) for storage alteration in a computer system.

2. Description of the Related Art

Computers and computer systems are found in a variety of settings in today's society. Computing environments and networks may be found at home, at work, at school, in government, and in other settings. In many computer systems, an operating system (OS) helps to share computer resources (processor, memory, disk space, network bandwidth, etc.) between users and application programs. Operating systems may also control access to the computer system in a security-related function.

Generally, computing environments known as servers store data in mass storage subsystems that typically include a number of disk storage units. Data is stored in units, such as files. In a server, a file may be stored on one disk storage unit, or alternatively portions of a file may be stored on several disk storage units. A server may service access requests from a number of users concurrently, and it will be appreciated that it will be preferable that concurrently serviced access operations be in connection with information that is distributed across multiple disk storage units, so that they can be serviced concurrently. Otherwise stated, it is generally desirable to store information in disk storage units in such a manner that one disk drive unit not be heavily loaded, or busy servicing accesses, and while others are lightly loaded or idle. Operating systems may be used, along with storage-specific applications, to facilitate the data storage.

In some cases, various issues may arise when data is allocated, either physically or virtually, over a portion of existing data by an operating system. These storage overlay problems may be difficult to diagnose in the operating system.

SUMMARY OF THE INVENTION

In some cases, storage overlays may be observed and present problems in various operating systems. Storage overlays may cause data outages and data loss. The primary technique for debugging such storage overlays in the IBM z/OS operating system has been the use of storage alteration slips. In general, use of the term "slip" may refer to Serviceability Level Indicator Processing and the accompanying acronym (SLIP). In general, SLIP processing is a diagnostic aid that intercepts or traps certain system events. For example, it can take be used to monitor the Program Status Word (PSW) storage address to identify when a specific instruction is executed. This type of program event recording (PER) slip is limited to having one active PER slip at a given time due to hardware limitation.

Two unique slips are typically used to diagnose storage overlays in the z/OS operating system. As an example on how this is implemented, a first slip identifies the offset of an instruction within a program where a data area in storage is first created and used by the code. The first slip which triggered after the data area was obtained is then disabled. The second slip is then enabled using the address of the new data area as input for the beginning of a range to be monitored. The second slip will then monitor any changes to the data area for a specific range. If any application overlays the storage block with invalid data then a dump of the effected storage is taken to identify the application.

While the second slip may be enabled by the satisfaction of a particular condition, there currently is no automated mechanism by which if, for example, a job associated with the storage block runs to completion without error, the second slip terminates. Instead, the end user may have to manually disable the second slip and take further action. A need exists for an automatic mechanism to implement SLIP processing in computer environments to appropriately diagnose storage alterations.

Accordingly, in one embodiment, by way of example only, a method for implementing Serviceability Level Indicator Processing (SLIPs) for storage alterations in a computer system is provided. A plurality of storage release requests is analyzed to identify an address monitored by a storage alteration slip. Upon identification of the address, the storage alteration slip is disabled and an initialization slip is re-enabled.

In another embodiment, again by way of example only, a system for implementing Serviceability Level Indicator Processing (SLIPs) for storage alterations in a computer system is provided. A slip module is operational on an operating system (OS) of the computer system. The slip module is adapted for analyzing a plurality of storage release requests to identify an address monitored by a storage alteration slip, and upon identification of the address, disabling the storage alteration slip and re-enabling an initialization slip.

In still another embodiment, again by way of example only, a computer program product for implementing Serviceability Level Indicator Processing (SLIPs) for storage alterations in a computer system is provided. The computer program product comprises a computer-readable storage medium having computer-readable program code portions stored therein. The computer-readable program code portions include a first executable portion for analyzing a plurality of storage release requests to identify an address monitored by a storage alteration slip, and a second executable portion for, upon identification of the address, disabling the storage alteration slip and re-enabling an initialization slip.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for dynamically implementing Serviceability Level Indicator Processing (SLIPs) for storage alterations in a computer system. The mechanisms allow for automated slip processing without the necessity of manual user intervention. Throughout the following description and claimed subject matter, reference will be made to two slips implemented for storage alterations in computer systems. The first slip, as discussed previously, that identifies an address location to monitor and involves a time to start monitoring the identified address may be referred to herein as an "initialization slip," as the first slip initializes, as part of its functionality, the monitoring process. The second slip, as discussed previously, that monitors the address location until the storage is altered (e.g., modified) may be referred to herein as a "storage alteration slip."

The mechanisms described below, in part, address the limitations of the two-slip methodology discussed previously. Currently, the second slip contains no mechanism by which to terminate and reset the first slip if an associated job runs to completion without error. In such cases, the storage monitored by the second slip would be legitimately freed, since the job terminated successfully. However, a subsequent application may reuse the virtual storage address for an additional job, and the second slip (still in operation) would be erroneously triggered. The current methodology requires the end user to manually disable the second slip and re-enable the first slip after the storage address is freed or the associated job completes.

In light of the foregoing, the mechanisms described below, in part, address these deficiencies by enhancing the slip processing (including associated logic) so that a first, initialization slip and a second, storage alteration slip would automatically reset at appropriate times, without the necessity of user interaction as is currently the case.

Figure 1:
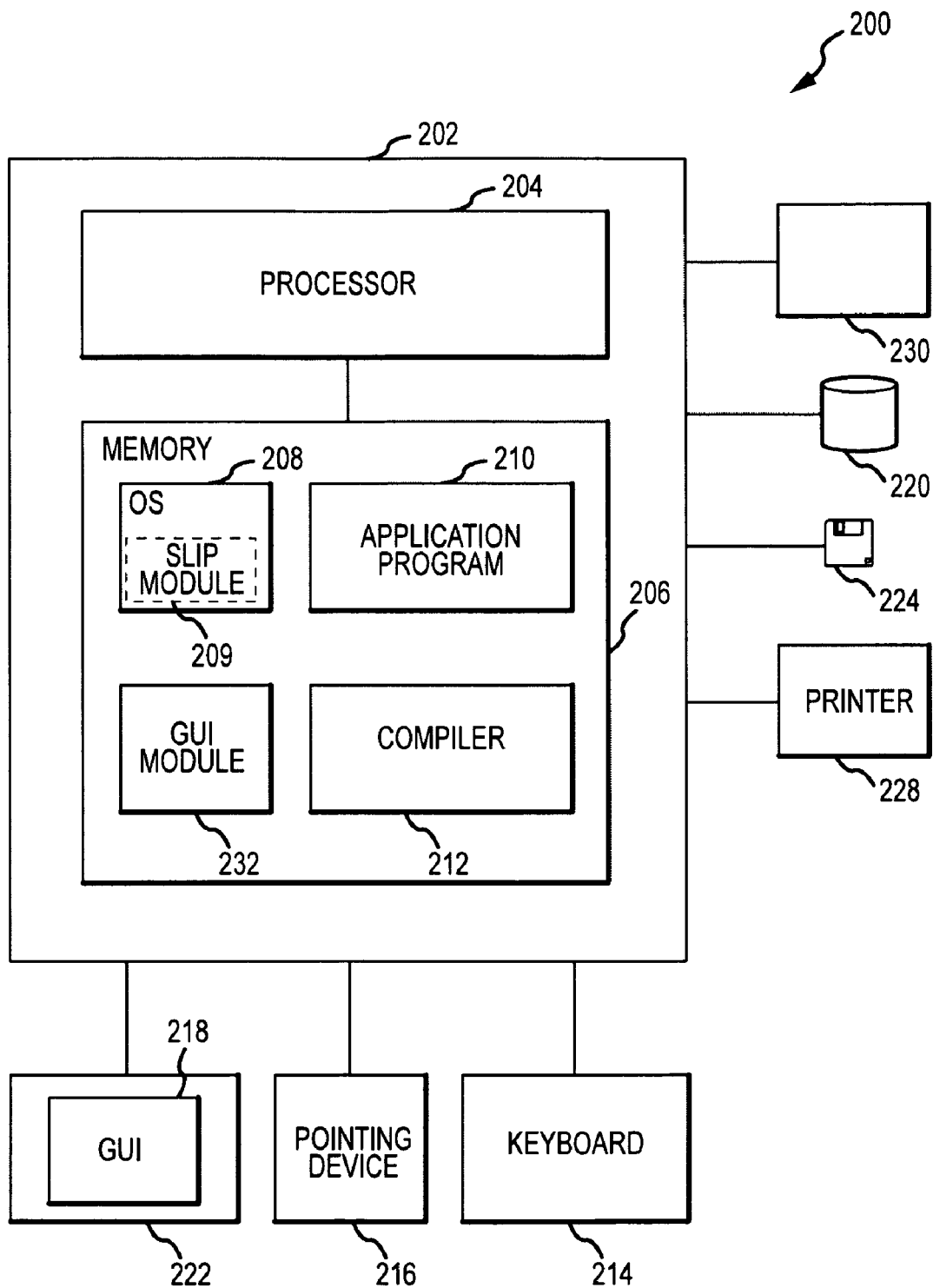
FIG. 1 illustrates an exemplary computing environment in which aspects of the present invention may be implemented.

FIG. 1 hereafter provides an example of computer environment in which the mechanisms of the following embodiments may be implemented. It should be appreciated, however, that FIG. 1 is only exemplary and is not intended to state or imply any limitation as to the particular architectures in which the exemplary aspects of the various embodiments may be implemented. Many modifications to the architecture depicted in FIG. 1 may be made without departing from the scope and spirit of the following description and claimed subject matter.

FIG. 1 illustrates an exemplary computer environment 200 that can be used to implement embodiments of the present invention. The computer 202 comprises a processor 204 and a memory 206, such as random access memory (RAM). The computer 202 is operatively coupled to a display 222, which presents images such as windows to the user on a graphical user interface 218. The computer 202 may be coupled to other devices, such as a keyboard 214, a mouse device 216, a printer, etc. Of course, those skilled in the art will recognize that any combination of the above components, or any number of different components, peripherals, and other devices, may be used with the computer 202.

Generally, the computer 202 operates under control of an operating system (OS) 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. In one embodiment of the present invention, the slip processing is facilitated by the z/OS operating system described previously. Although the GUI module 232 is depicted as a separate module, the instructions performing the GUI functions can be resident or distributed in the operating system 208, the computer program 210, or implemented with special purpose memory and processors. The computer 202 also implements a compiler 212 which allows an application program 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic that was generated using the compiler 212. The computer 202 also optionally comprises an external data communication device 230 such as a modem, satellite link, ethernet card, wireless link or other device for communicating with other computers, e.g. via the Internet or other network.

In one embodiment, instructions implementing the operating system 208, the computer program 210, and the compiler 212 are tangibly embodied in a computer-readable medium, e.g., data storage device 220, which may include one or more fixed or removable data storage devices, such as a zip drive, disc 224, hard drive, DVD/CD-ROM, digital tape, etc., which are generically represented as the disc 224. Further, the operating system 208 and the computer program 210 comprise instructions which, when read and executed by the computer 202, cause the computer 202 to perform the steps necessary to implement and/or use the present invention. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention may include one or more associated software application programs 210 that include, for example, functions for managing a distributed computer system comprising a network of computing devices, such as a storage area network (SAN). The program 210 may operate within a single computer 202 or as part of a distributed computer system comprising a network of computing devices. The network may encompass one or more computers connected via a local area network and/or Internet connection (which may be public or secure, e.g. through a VPN connection), or via a fibre channel Storage Area Network or other known network types as will be understood by those skilled in the art. (Note that a fibre channel SAN is typically used only for computers to communicate with storage systems, and not with each other.)

Operating system 208 includes a slip module 209. The slip module may operate in conjunction with program(s) 210, and other components within the computer environment 200, to implement Serviceability Level Indicator Processing (SLIPs) on the environment 200. In one embodiment, the slip module 209 is adapted to perform various methodologies which will be further described, such as enabling or disabling the initialization slip, and enabling or disabling the storage alteration slip while re-enabling the initialization slip. As one skilled in the art will appreciate, however, various additional components of the environment 200 may work individually or in concert to define, initialize, and perform the slip functionality as will be further described.

In general, and in accordance with the present invention, slip processing may be enhanced with various changes. The changes may be implemented automatically without the necessity of user interaction with the environment 200. The changes will be described in additional detail. In general, however, the changes may include monitoring functionality incorporated within the slip module that compares all storage release requests to determine if the address space monitored by the storage alteration slip is within a range of storage being freed. In other words, if a storage release request corresponds with the address space monitored by the storage alteration slip, the monitoring functionality is adapted to determine, as a result, that the storage alteration slip is no longer needed (i.e., the storage was freed by a successfully terminating job, for example). The slip module may then disable the storage alteration sip and re-enable the initialization slip.

In addition, during a normal operation when the initialization slip enables the storage alteration slip as a result of a satisfied condition, location information associated with the initialization slip may be saved in a control file in order for the storage alteration slip to later use the location information to reset the initialization slip.

Finally, the monitoring functionality in the slip module may be configured to monitor a pre-specified job name and/or address space associated with that job name. When the job terminates successfully without error, the storage associated with that job is correspondingly released. As a result, the storage alteration slip is no longer valid. The monitoring functionality of the slip module may therefore be adapted to monitor the job name and/or address space to successful termination. Upon determination of the successful termination, the monitoring functionality may then disable the storage alteration slip and re-enable the initialization slip.

Figure 2:
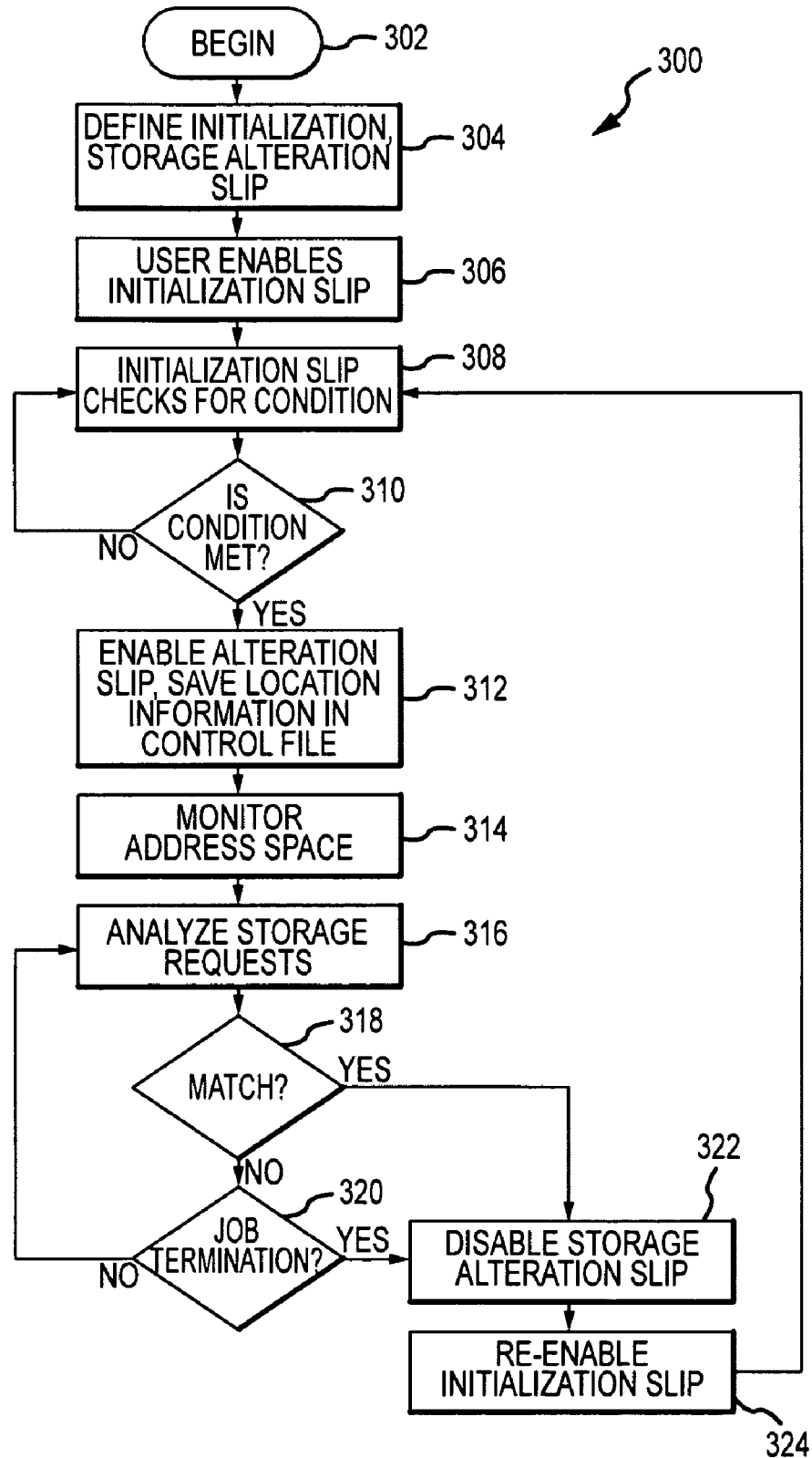
FIG. 2 illustrates an exemplary method for implementing Serviceability Level Indicator Processing (SLIPs) for storage alterations in a computer system.

Turning to FIG. 2, an exemplary method 300 is depicted for implementing Serviceability Level Indicator Processing for storage alteration in a computer system. As one skilled in the art will appreciate, various steps in the method 300 may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums. While the method 300 relates specifically to the depicted functionality, various steps in the method 300 may be adapted for monitoring and trapping storage in other scenarios and implementations.

Method 300 begins (step 302) by defining the initialization and storage alteration slips for a particular implementation (step 304). As part of the definition process, the user may designate the storage location to be monitored, and/or a time to begin monitoring the address in question. The user also, for example, may designate a particular storage condition that would satisfy the initialization slip, such as the correct filling of a storage block with data. A storage alteration slip name and a code offset may also be defined.

As a next step, the user may enable the initialization slip to begin the monitoring process (step 306). The initialization slip then checks to see if the pre-designated condition was satisfied (step 308). If the condition is not met (step 310), then the initialization slip continues to check for the condition to be satisfied, returning to step 308. If the condition is satisfied (again, step 310), then the initialization slip is disabled, the storage alteration slip is enabled, and the location information is saved in a control file as described previously (step 312).

As part of the functionality of the storage alteration slip, the storage address space is monitored (step 314). Each storage release request is analyzed to compare the storage requested to be freed with the storage being monitored (step 314). If a match is not determined (step 318), then the method 300 continues to monitor the address space/job names to determine if the pre-specified job name has successfully concluded without error. If the job name has not been concluded to successfully terminate (step 320), then the system continues to monitor the address space and analyze storage requests (again, step 316).

If a storage request/storage match is determined, then the storage alteration slip is disabled (step 322). The initialization slip is re-enabled (step 324), this time with new storage information (i.e., address, job name, etc.), and the method 300 returns to performing initialization slip checks for the pre-specified condition (again, step 308).

Returning to Step 320, similarly, if a job name is determined to successfully terminate, the system is made aware that the storage space being monitored has been successfully freed. Accordingly, the storage alteration slip is disabled (step 322), the initialization slip is re-enabled (again, with new information) (step 324), and the initialization slip monitoring process begins anew (again, step 308).

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for implementing Serviceability Level Indicator Processing (SLIPs) for storage alterations in a computer system, comprising:

enabling, by a processor, an initialization SLIP to monitor a storage address, the storage address comprising current storage information;

monitoring, by the initialization SLIP, the storage address to determine if a predetermined condition associated with the current storage condition has been satisfied;

continuing to monitor the storage address if the predetermined condition has not been satisfied;

disabling the initialization SLIP and enabling a storage alteration SLIP if the predetermined condition has been met;

monitoring, by the alteration SLIP, the storage address to determine if data in the storage address is released;

determining if a pre-specified job name associated with the storage alteration SLIP has been terminated if the data in the storage address has not been released;

continuing to monitor the storage address to determine if the data in the storage address is released if the pre-specified job name associated with the storage alteration SLIP has not been terminated; and upon determining that one of the data in the storage address is released and the pre-specified job name associated with the storage alteration SLIP has been terminated, disabling, by the processor, the storage alteration SLIP and automatically re-enabling the initialization SLIP with new storage information related to the storage address.

2. The method of claim 1, further including:

enabling the storage alteration SLIP in response to meeting a storage condition, and saving location information associated with the initialization SLIP in a control file.

3. The method of claim 2, further including enabling the initialization SLIP to determine if the storage condition is met.

4. The method of claim 3, wherein enabling the initialization SLIP includes defining a storage alteration SLIP name, a code offset, and a condition.

5. The method of claim 4, further including:

monitoring a pre-specified job name associated with the storage alteration SLIP, and upon detection of a termination of the job name, disabling the storage alteration SLIP and enabling the initialization SLIP.

6. The method of claim 5, further including monitoring a pre-specified address space associated with the storage alteration SLIP to detect the termination of the job name.

7. A system for implementing Serviceability Level Indicator Processing (SLIPs) for storage alterations in a computer system, comprising:

a processor configured to execute an operating system (OS); and a SLIP module operational on the OS, the SLIP module adapted for:

enabling an initialization SLIP to monitor a storage address, the storage address comprising current storage information, monitoring the storage address to determine if a predetermined condition associated with the current storage condition has been satisfied, continuing to monitor the storage address if the predetermined condition has not been satisfied, disabling the initialization SLIP and enabling a storage alteration SLIP if the predetermined condition has been met, monitoring, by the alteration SLIP, the storage address to determine if data in the storage address is released, determining if a pre-specified job name associated with the storage alteration SLIP has been terminated if the data in the storage address has not been released, continuing to monitor the storage address to determine if the data in the storage address is released if the pre-specified job name associated with the storage alteration SLIP has not been terminated, and upon determining that one of the data in the storage address is released and the pre-specified job name with the storage alteration SLIP has been terminated, disabling the storage alteration SLIP and automatically re-enabling the initialization SLIP with new storage information related to the storage address.

8. The system of claim 7, wherein the SLIP module is further adapted for:

enabling the storage alteration SLIP in response to meeting a storage condition, and saving location information associated with the initialization SLIP in a control file.

9. The system of claim 8, wherein the SLIP module is further adapted for enabling the initialization SLIP to determine if the storage condition is met.

10. The system of claim 9, wherein the SLIP module is further adapted to define a storage alteration SLIP name, a code offset, and a condition.

11. The system of claim 10, wherein the SLIP module is further adapted for:

monitoring a pre-specified job name associated with the storage alteration SLIP, and upon detection of a termination of the job name, disabling the storage alteration SLIP and enabling the initialization SLIP.

12. The system of claim 11, wherein the SLIP module is further adapted for monitoring a pre-specified address space associated with the storage alteration SLIP to detect the termination of the job name.

13. A computer program product for implementing Serviceability Level Indicator Processing (SLIPs) for storage alterations in a computer system, the computer program product comprising a computer-readable storage medium having computer-readable program code portions stored therein, the computer-readable program code portions comprising:

a first executable portion for enabling, by a processor, an initialization SLIP to monitor a storage address, the storage address comprising current storage information;

a second executable portion for monitoring, by the initialization SLIP, the storage address to determine if a predetermined condition associated with the current storage condition has been satisfied;

a third executable portion for continuing to monitor the address if the predetermined condition has not been satisfied;

a fourth executable portion for disabling the initialization SLIP and enabling a storage alteration SLIP if the predetermined condition has been met;

a fifth executable portion for monitoring, by the alteration SLIP, the storage address to determine if data in the storage address is released;

a sixth executable portion for determining if a pre-specified job name associated with the storage alteration SLIP has been terminated if the data in the storage address has not been released;

a seventh executable portion for continuing to monitor the storage address to determine if the data in the storage address is released if the pre-specified job name associated with the storage alteration SLIP has not been terminated; and an eighth executable portion for, upon determining that one of the data in the storage address is released and the pre-specified job name with the storage alternation SLIP has been terminated, disabling the storage alteration SLIP and automatically re-enabling the initialization SLIP with new storage information related to the storage address.

14. The computer program product of claim 13, further including:
   a ninth executable portion for enabling the storage alteration SLIP in response to meeting a storage condition, and
   a tenth executable portion for saving location information associated with the initialization SLIP in a control file.

15. The computer program product of claim 14, further including a eleventh executable portion for enabling the initialization SLIP to determine if the storage condition is met.

16. The computer program product of claim 15, further including an twelfth executable portion for defining a storage alteration SLIP name, a code offset, and a condition.

17. The computer program product of claim 16, further including:
   a thirteenth executable portion for monitoring a pre-specified job name associated with the storage alteration SLIP, and
   a fourteenth executable portion for, upon detection of a termination of the job name, disabling the storage alteration SLIP and enabling the initialization SLIP.

18. The computer program product of claim 17, further including a fifteenth executable portion for monitoring a pre-specified address space associated with the storage alteration SLIP to detect the termination of the job name.

* * * * *